(12) United States Patent
Konicek et al.

(10) Patent No.: US 11,858,650 B2
(45) Date of Patent: Jan. 2, 2024

(54) MANUALLY ACTUATED HYDRAULIC CIRCUIT FOR RAM AIR TURBINE (RAT) RESTOW

(71) Applicant: Hamilton Sundstrand Corporation, Charlotte, NC (US)

(72) Inventors: Timothy Scott Konicek, Rockford, IL (US); Stuart T. Gerger, Madison, WI (US); Stephen Michael Bortoli, Roscoe, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 386 days.

(21) Appl. No.: 16/791,139

(22) Filed: Feb. 14, 2020

(65) Prior Publication Data

US 2021/0253266 A1 Aug. 19, 2021

(51) Int. Cl.
 *B64D 41/00* (2006.01)
 *F01D 15/10* (2006.01)
 (Continued)

(52) U.S. Cl.
 CPC ........... *B64D 41/007* (2013.01); *F01D 15/10* (2013.01); *F02C 7/32* (2013.01); *F15B 15/1476* (2013.01);
 (Continued)

(58) Field of Classification Search
 CPC .. B64D 41/007; F15B 15/1476; F15B 15/202; F15B 2211/3058; F15B 2211/324;
 (Continued)

(56) References Cited

U.S. PATENT DOCUMENTS

| 2,924,403 A | 2/1960 | Mohrlock, Jr. |
| 3,633,411 A | 1/1972 | Hann et al. |
| (Continued) | | |

FOREIGN PATENT DOCUMENTS

| DE | 1576150 A1 | 2/1970 |
| EP | 0355325 A1 | 2/1990 |
| (Continued) | | |

OTHER PUBLICATIONS

European Search Report issued in European Application No. 21156961.1; Application Filing Date Feb. 12, 2021, dated Jun. 24, 2021 (8 pages).

(Continued)

*Primary Examiner* — Brian P Wolcott
*Assistant Examiner* — Jesse M Prager
(74) *Attorney, Agent, or Firm* — CANTOR COLBURN LLP

(57) ABSTRACT

A ram air turbine (RAT) restow system includes an actuator assembly with a piston interposed between an upper fluid compartment and a lower fluid compartment. The actuator assembly is configured to selectively move the piston between a deployed position and a stowed position. A hydraulic restow circuit is interposed between the actuator assembly and a hydraulic fluid system that is configured to output fluid. The hydraulic restow circuit includes a restow valve configured to operate in a first position that establishes a first fluid path to deliver the fluid to the upper fluid compartment and a second position that establishes a second fluid path to deliver the fluid to the lower fluid compartment.

6 Claims, 7 Drawing Sheets

(51) Int. Cl.
*F02C 7/32* (2006.01)
*F15B 15/14* (2006.01)
*F15B 15/20* (2006.01)

(52) U.S. Cl.
CPC ........ *F15B 15/202* (2013.01); *F05D 2220/34* (2013.01); *F05D 2260/57* (2013.01); *F15B 2211/3058* (2013.01); *F15B 2211/324* (2013.01); *F15B 2211/7052* (2013.01)

(58) Field of Classification Search
CPC .......... F15B 2211/7052; F15B 2211/85; F15B 2211/895; F15B 13/10; F15B 15/261; F15B 13/0406; F15B 15/226; F15B 15/26; F15B 15/262; F15B 15/264; F15B 15/265; F15B 2015/267; F05D 2220/34; F05D 2260/57; F01D 15/10; F02C 7/32
See application file for complete search history.

(56) References Cited

U.S. PATENT DOCUMENTS

| | | | | |
|---|---|---|---|---|
| 5,054,721 | A | * | 10/1991 | Brenholt ............... B64C 31/028 244/210 |
| 6,269,838 | B1 | * | 8/2001 | Woodworth ........ F15B 13/0406 137/625.22 |
| 2010/0300117 | A1 | | 12/2010 | Moulebhar |
| 2015/0096437 | A1 | | 4/2015 | Russ |
| 2016/0039532 | A1 | * | 2/2016 | Larson, Jr. .............. F15B 7/006 417/375 |
| 2016/0288919 | A1 | * | 10/2016 | Sasscer ................ B64D 41/007 |
| 2016/0341225 | A1 | | 11/2016 | Bannon et al. |
| 2016/0377154 | A1 | | 12/2016 | Trybula et al. |
| 2018/0050813 | A1 | * | 2/2018 | Larson, Jr. .............. F01D 25/28 |

FOREIGN PATENT DOCUMENTS

| | | | | |
|---|---|---|---|---|
| EP | 3095708 | A1 | | 11/2016 |
| EP | 3553325 | A1 | | 10/2019 |
| GB | 727752 | A | | 4/1955 |
| GB | 2586790 | A | * | 3/2021 ............. B64C 13/36 |

OTHER PUBLICATIONS

Search Report issued in European Application No. 21156961.1; Application Filing Date Feb. 12, 2021, dated Mar. 29, 2023 (4 pages).

* cited by examiner

US 11,858,650 B2

MANUALLY ACTUATED HYDRAULIC CIRCUIT FOR RAM AIR TURBINE (RAT) RESTOW

BACKGROUND

The present disclosure is generally related to aircraft systems, and more particularly to aircraft ram air turbine systems.

Ram air turbines (RATs) are small turbines installed on aircrafts to provide emergency power. Generally, the RAT can be stowed inside of the fuselage or wing of an aircraft and manually or electronically deployed into an airstream outside of the aircraft during a power outage. The RAT rotates in the airstream to generate hydraulic and/or electric power for the aircraft. Once the aircraft has landed, the RAT can be restowed, depending on the deployment actuator configuration, by either manually operating a hydraulic actuator pump for retracting the RAT into a stowed position or operating an electrical switch that controls an electrically activated hydraulic solenoid valve that retracts the RAT into the stowed position.

BRIEF DESCRIPTION

According to a non-limiting embodiment, a ram air turbine (RAT) restow system includes an actuator assembly with a piston interposed between an upper fluid compartment and a lower fluid compartment. The actuator assembly is configured to selectively move the piston between a deployed position and a stowed position. A hydraulic restow circuit is interposed between the actuator assembly and a hydraulic fluid system that is configured to output fluid. The hydraulic restow circuit includes a restow valve configured to operate in a first position that establishes a first fluid path to deliver the fluid to the upper fluid compartment and a second position that establishes a second fluid path to deliver the fluid to the lower fluid compartment.

According to another non-limiting embodiment, a hydraulic restow circuit is configured to restow a ram air turbine (RAT) coupled to an actuator assembly. The hydraulic restow circuit includes a first pair of actuator fluid lines in fluid communication with the actuator assembly, and a second pair of aircraft fluid lines in fluid communication with a fluid source. The hydraulic restow circuit further includes a restow valve configured interposed between the first pair of actuator fluid lines and the second pair of aircraft fluid lines. The restow valve is configured to operate in a normal position to deliver fluid from the fluid source to an upper fluid compartment of the actuator assembly and a restow position to deliver the fluid to a lower fluid compartment of the assembly actuator.

According to yet another non-limiting embodiment, a method is provided to restow a ram air turbine (RAT) coupled to an actuator assembly. The method comprises displacing a piston included in an actuator assembly from a stowed position into a displaced position so as to deploy a RAT coupled to the piston, and delivering fluid from a hydraulic fluid system to a hydraulic restow circuit interposed between the actuator assembly and the hydraulic fluid system. The method further comprises transitioning a restow valve from a normal position to a restow position to deliver the fluid to a lower fluid compartment of the actuator assembly, and increasing the pressure in the lower fluid compartment so as to force the piston into the stowed position so as to restow the RAT.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
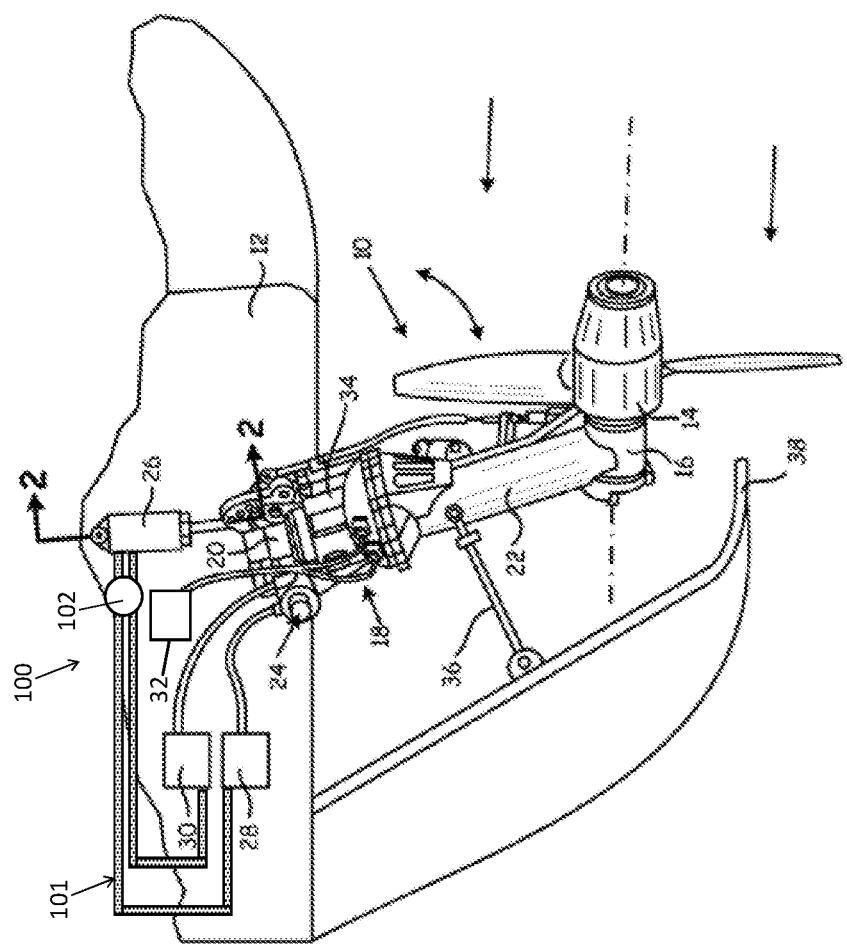
FIG. 1 is a perspective view of an embodiment of a RAT assembly according to a non-limiting embodiment.

As previously discussed, the RAT, depending on the deployment actuator configuration, can be restowed by either manually operating a hydraulic actuator pump for retracting the RAT into a stowed position or operating an electrical switch that controls an electrically activated hydraulic solenoid valve that adjusts the RAT to and from the stowed position. The conventional manual operation process requires a human maintenance operator to manually operate a hydraulic pump. The hydraulic pump supplies high pressure fluid to the actuator, which in turn forces the actuator to retract such that the RAT is transitioned into a stow position and within the aircraft. However, the conventional manual restow process involves strenuous activities that are inconvenient to the maintenance operator. For instance, the manual pump operation requires the maintenance operator to transition and hold a momentary valve within the restow pump to allow fluid from the restow pump to enter the actuator. Simultaneously, the maintenance operator must manually actuate the restow pump handle over several pump cycles to pressurize fluid contained within the restow pump body.

The electrical switch (which can be implemented by a stow panel or controller) and electrically activated hydraulic solenoid valve aim to reduce the physical work and effort required by the maintenance operator. However, additional components such as the stow panel/controller, hydraulic solenoid valve, aircraft fluid ports, a secondary pilot valve, and additional pressure sensors are necessary to facilitate the electrical restow operation. As a result, the conventional electrical restow approach adds complexity, monetary costs, and weight to the RAT system.

Various non-limiting embodiments described herein provides a manually activated hydraulic circuit that omits the costly additional components employed in the conventional electronic restow approach, while still allowing a maintenance operator to conveniently facilitate RAT restow. The manually activated hydraulic circuit includes a manually actuated hydraulic valve that supplies high pressure fluid from the aircraft hydraulic system to the actuator, which in turn forces retraction of actuator and transitions the RAT into the stow position.

In one or more non-limiting embodiments, the manually actuated hydraulic valve is installed between the supply and return ports of the RAT actuator and the hydraulic supply and return ports of the aircraft hydraulic system. To restow the RAT, a maintenance operator manually rotates the hydraulic valve from a first position (e.g., normal position) to a second position (e.g., restow position). The restow position allows high pressure fluid to be ported into the actuator cylinder so as to increase the pressure applied to the lower end of the actuator piston. In turn, the piston is displaced so as to retract the actuator and RAT back into the stowed position. In this configuration, fluid on the opposite side of the piston is also allowed to exit the actuator, returning to the aircraft. Once the RAT is restowed, the hydraulic valve is returned to the normal position to properly configure the hydraulic connections for future deployment.

With reference now to FIG. 1, a RAT restow system 100 including a RAT assembly 10 in fluid communication with a manually actuated hydraulic restow circuit 101 is illustrated according to a non-limiting embodiment. The RAT assembly 10 is mounted to an airframe 12 and is deployable between a stowed position for storage when not in use and a deployed position to provide electric power and/or hydraulic pressure. FIG. 1 illustrates the RAT assembly 10 in a deployed position. The RAT assembly 10 includes a turbine 14, a gearbox 16, a generator 18, a hydraulic pump 20, a strut 22, a pivot post (or swivel post) 24, an actuator assembly 26, a low pressure fluid supply location 28, a high pressure fluid delivery location 30, an electricity delivery location 32, a generator housing 34 (also simply called a "housing"), and a door linkage 36. It should be noted that the RAT assembly 10 illustrated in FIG. 1 is shown merely by way of example and not limitation. Those of ordinary skill in the art will recognize that other RAT assembly configurations are possible. For instance, in further embodiments, either the generator 18 or the hydraulic pump 20 could be omitted entirely. Other components not specifically identified can also be included with the RAT assembly 10.

The turbine 14 is supported at or near the end of strut 22, which in turn is attached to the generator housing 34. The generator housing 34 is mounted to the airframe 12 with the swivel post 24, which allows pivotal movement of the turbine 14, strut 22, generator housing 34, etc. relative to the airframe 12 and can further provide fluid paths between the hydraulic pump 20 and both the low pressure fluid supply location 28 and the high pressure fluid delivery location 30. The generator 18 is disposed within the generator housing 34, and the hydraulic pump is supported on the generator housing 34. The generator 18 can generate electric power that can be supplied to the electricity delivery location 32. The hydraulic pump 20 can pump the fluid to various systems that utilize pressurized fluid for operation.

During flight, the turbine 14 can rotate responsive to airflow along the outside of the airframe 12. Rotational power from the turbine 14 can be transmitted through the gearbox 16 to either or both the generator 18 and the hydraulic pump 20 for operation. The hydraulic pump 20 can be coupled to the generator 18 such that the hydraulic pump 20 rotates at the same speed as the generator 18. In alternative embodiments, the hydraulic pump 20 and the generator can be rotated at different speeds.

The actuator assembly 26 can be configured as a combination spring- and fluidically-actuated mechanism for selectively deploying and stowing the RAT assembly 10. A spring mechanism (not visible in FIG. 1) can provide a biasing force to the RAT 10 in order to deploy the RAT assembly 10 when a locking mechanism such as, for example, a locking pawl or uplock (not shown) is released. A fluid (e.g., conventional hydraulic fluid) can be selectively introduced to a fluidic cylinder of the actuator assembly 26 to selectively provide force to stow the RAT assembly 10, and can act as a part of a snubbing mechanism to help control movement of the RAT assembly 10 during deployment, and/or provide other functions. Further details of the actuator assembly are described below.

The actuator assembly 26 further actuates at least one door 38 that can cover a RAT storage compartment in the airframe 12 in which the RAT assembly 10 can be stowed. The door linkage 36 can mechanically connect the door 38 to the strut 22 or another suitable structure (e.g., the generator housing 34) of the RAT assembly 10. In this way, movement of the strut 22 accomplished using the actuator assembly 26 can be transmitted to the door 38 through the door linkage 36, such that the door 38 is concurrently and simultaneously moved by the actuator assembly 26, relative to the airframe 12.

Still referring to FIG. 1, the manually activated hydraulic circuit includes a manually actuated hydraulic valve 102. The manually actuated hydraulic valve 102 selectively supplies high pressure fluid (e.g., hydraulic fluid) to the actuator assembly 26, which in turn forces the actuator assembly 26 in a retracted position. Accordingly, the RAT assembly can be transitioned into the stow position and restowed in the RAT storage compartment in the airframe 12.

Figure 2:
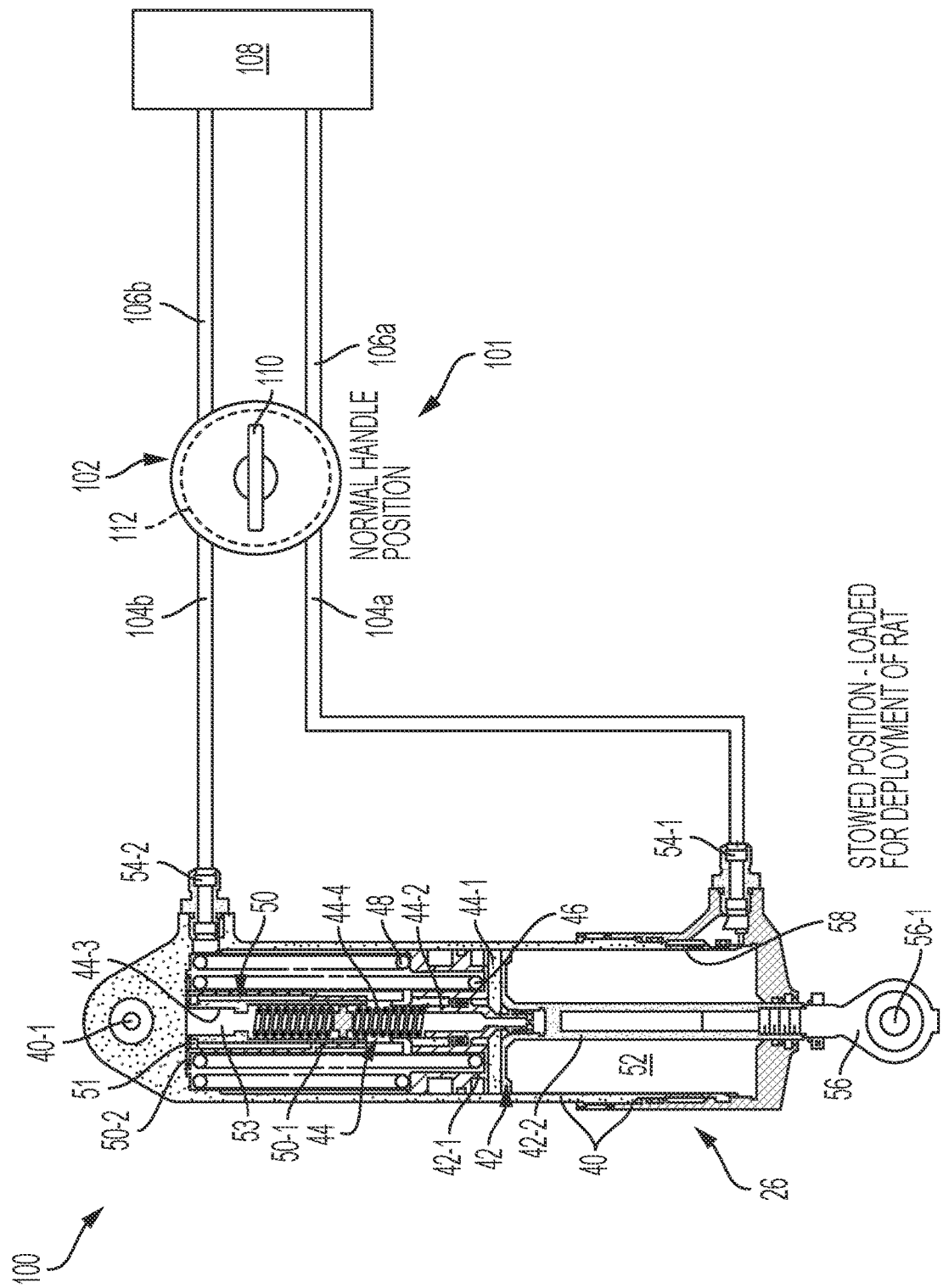
FIG. 2 illustrates a RAT actuator assembly in fluid communication with a manually actuated hydraulic restow circuit according to a non-limiting embodiment.

Turning to FIG. 2, a cross-sectional view of the actuator assembly 26 included in a RAT restow system 100 is illustrated according to a non-limiting embodiment. The view of the actuator assembly 26 is taken along line 2-2 of FIG. 1 is illustrated according to a non-limiting embodiment and depicts the actuator assembly 26 in a stowed position. The actuator assembly 26 includes a housing 40, a piston 42, a piston subassembly 44, one or more springs 46 and 48, a spring guide 50, a stop 51, a lower fluid compartment 52, an upper fluid compartment 53, an actuator supply fluid port 54-1, and an actuator return fluid port 54-2. The actuator assembly 26 can further include a conventional locking mechanism (not shown), such as a locking pawl, uplock, etc., to help maintain the RAT assembly 10 in a stowed position prior to selective release of the locking mechanism.

The housing 40 can be configured as a two-part cylinder. A connection point 40-1 can be provided at one end of the housing 40, to allow mechanical connection of the housing 40 to a desired mounting location (e.g., to a portion of the RAT assembly 10 or to the airframe 12). The housing 40 can be made of a metallic material.

The piston 42 can be configured as a single unitary and monolithic piece that includes a piston head 42-1 (sometimes referred to as a downlock portion) 42-1 and a rod portion 42-2. The piston head 42-1 can be positioned inside the housing 40, and the rod portion 42-2 can extend through the housing 40. A diameter of the piston head 42-1 can be relatively small relative to prior art actuator piston heads to help make room for a first (e.g., inner) spring 46. An end of the rod portion 42-2 of the piston 42 can be connected to an eyelet structure 56, in which a monoball or spherical bearing can be positioned. The eyelet structure 56 can provide a connection point 56-1, allowing the eyelet structure 56 and the piston 42 to be mechanically connected to a desired mounting location (e.g., to a portion of the RAT assembly 10 or to the airframe 12). Actuation of the actuator assembly 26 can produce displacement between the connection point 40-1 (associated with the housing 40) and the connection point 56-1 (associated with the piston 42). Movement of the piston 42, and therefore available displacement between the connection points 40-1 and 56-1, defines an overall actuation (or deployment) stroke that places the actuator assembly in the deployed position.

The fluid compartment 52 can provide a working area for a suitable fluid (e.g., hydraulic fluid) used to selectively control operation of the actuator assembly 26. The piston 42 can be positioned along the fluid compartment 52, such that the fluid compartment 52 provides a volume for the fluid to be introduced to control the relative positions of the housing 40 and the piston 42. The fluid can pass into and out of the fluid compartment 52 through the housing 40 by way of an actuator supply fluid port 54-1 and an actuator return fluid port 54-2. The fluid in and out of the actuator assembly 26 is controlled using the manually actuated hydraulic restow circuit 101, which is discussed in greater detail below.

Figure 6:
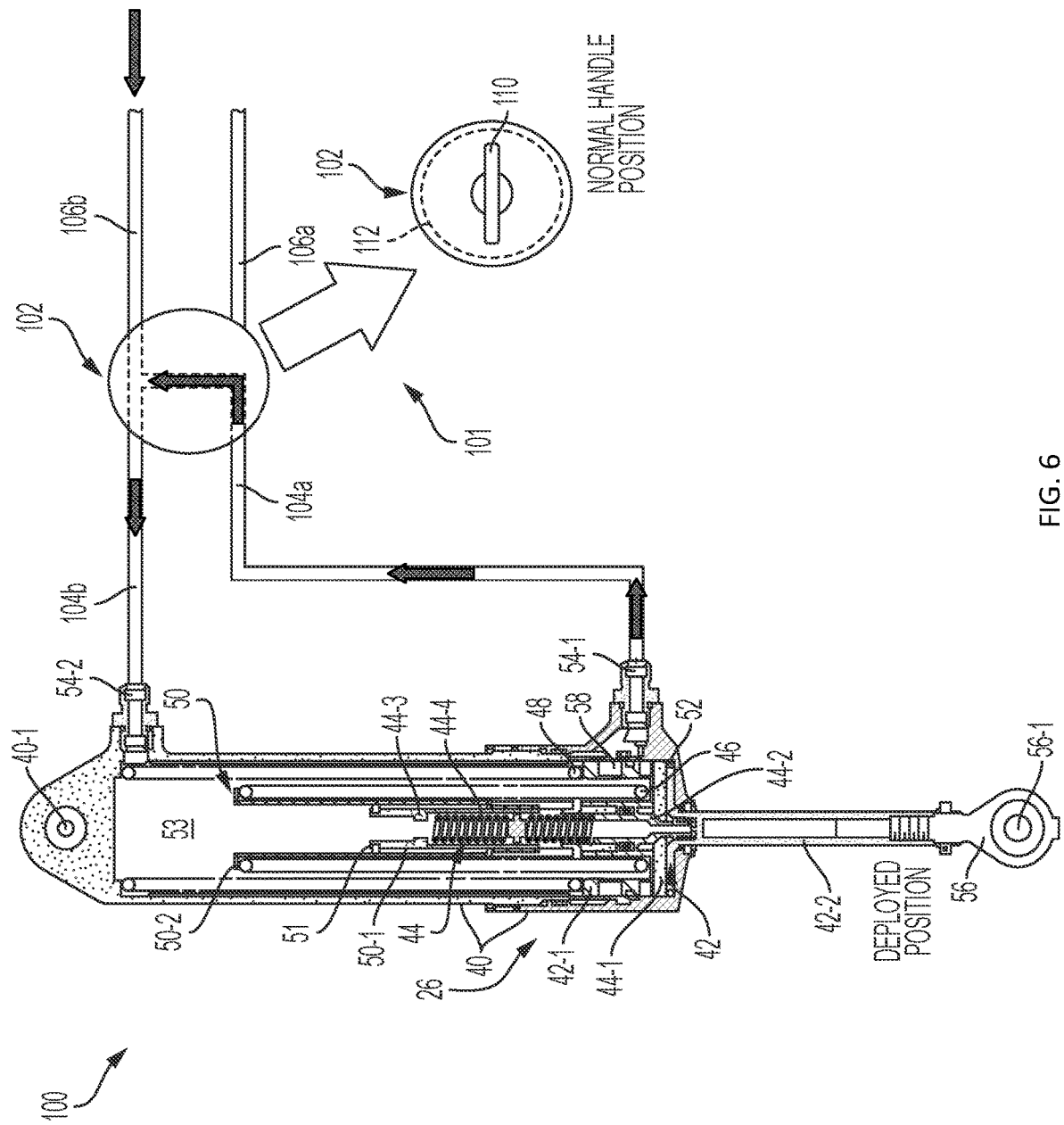
FIG. 6 illustrates operation of the RAT actuator assembly and manually actuated hydraulic restow circuit while the actuator is in the deployed position and the manually actuated restow valve is in the normal operating position according to a non-limiting embodiment.

The piston subassembly 44 can be of any desired configuration, including known designs. When the actuator assembly 26 is in a fully deployed position (as shown in FIG. 6), the piston subassembly 44 can selectively lock the piston 42 relative to the housing 40, thereby helping to lock the actuator assembly 26 in the fully deployed position for operation. Further, it should be understood that the piston subassembly 44 is provided merely by way of example and not limitation. Persons of ordinary skill in the art will appreciate that other downlock mechanisms can be utilized in further embodiments, or can be omitted entirely.

The springs 46 and 48 can be helical coil springs that cooperate to provide actuation force capable of deploying the actuator assembly 26, along with any connected deployable components such as the RAT assembly 10 and the door 38. Although two springs 46 and 48 are described herein, it should be appreciated more or less springs can be employed without departing from the scope of the invention.

The springs 46 and 48 can be held in compression when the RAT assembly 10 is in the stowed position, and the potential energy of the springs 46 and 48 released to provide deployment force when the locking mechanism (e.g., locking pawl) is released (as already noted, the locking mechanism is not specifically shown). The first and second springs 46 and 48 can each have relatively high spring load capacities. In one embodiment, round spring wires are used for one or both of the springs 46 and 48. Alternatively, square cross-section spring wires can be used for one or both of the springs 46 and 48 to provide even higher load capacity within the same envelope as a round wire spring. Titanium, and alloys thereof, can be used to make one or both of the springs 46 and 48, which offers a larger load capacity in the same envelope than stainless steel springs. In still further embodiments, other materials such as stainless steel can be used for the springs 46 and 48, typically with corresponding adjustments to the diameter of the housing 40 to accommodate the necessary spring size for given material combinations.

In the illustrated embodiment, the springs 46 and 48 are coaxially and concentrically position with the first spring 46 positioned radially inward from (i.e., at least partially within and encircled by) the second spring 48. In one embodiment, the first and second springs 46 and 48 can be helical springs having coil shapes wound in opposite directions, which can help reduce a risk of interference as the springs 46 and 48 compress and/or expand.

First ends of each of the first and second springs 46 and 48 can each be operatively engaged with the piston 42, and the first end of the first spring 46 can be in physical contact with the piston head 42-1 of the piston 42. A second end of the first spring 46 located opposite the first end can be operatively engaged with the spring guide 50. A second end of the second spring 48 located opposite the first end can be operatively engaged with the housing 40, and can further be in physical contact with an interior surface of the housing 40. Persons of ordinary skill in the art will appreciate that relative relationships of the first and second springs 46 and 48 relative to the spring guide 50 can readily be reversed in alternative embodiments.

The spring guide 50 can be a sliding member that allows the first (e.g., inner) spring 46 to deploy as long as necessary, and then allows the first spring 46 to travel—unloaded to its minimum working height—with the piston 42 during a remainder of a deployment stroke. Use of the spring guide 50 helps prevent the first spring 46 from becoming misaligned during any portion of the deployment stroke.

The spring guide 50 of the illustrated embodiment is configured as a generally sleeve-like member having a stop 50-1 and a flange 50-2. The stop 50-1 can be arranged at an inner diameter portion of the spring guide 50. The flange 50-2 can extend generally radially outward, and can be arranged at or near an opposite end of the spring guide 50 from the stop 50-1. The flange 50-2 can provide opposing contact surfaces for the first spring 46 and the housing 40, respectively, and can selectively transmit actuation biasing force from the first spring 46 to the housing 40 when in contact with the housing 40. The stop 50-1 can be arranged for sliding engagement with a portion of the piston subassembly 44, and can interact with the stop 51 to restrict axial movement of the spring guide 50 (relative to the piston subassembly 44) during the deployment process. In that way the spring guide 50 can be operatively engaged with the piston 42 in an indirect manner, via the sliding engagement with at least a portion of the piston subassembly 44 that moves with the piston 42.

In alternative embodiments, the spring guide 50 can be engaged with either spring 46 or 48, and can be engaged with any desired portion of the piston 42, the piston subassembly 44 or any other suitable component of the actuator assembly 26 that can travel with the piston 40. Accordingly, the spring guide 50 can still provide a suitable stroke limit on the engaged spring 46 or 48.

During operation, the springs 46 and 48 can work together to overcome an opposing load (i.e., loading on the actuator assembly 26 from the RAT assembly 10, the door 38, etc.). More particularly, the springs 46 and 48 coil springs can both provide actuation force over a first portion of the overall actuation stroke. In general, to help optimize performance, the first spring 46 (e.g., the inner spring) can provide the most load capacity if only applying load for the minimum portion of the actuation stroke needed (compared to the total deployment stroke for the actuator assembly 26), with the second spring 48 (e.g., the outer spring) providing the remaining load capacity to finish the deployment stroke, or vice-versa.

Still referring to FIG. 2, the manually actuated hydraulic restow circuit 101 includes a manually actuated hydraulic valve 102 interposed between a pair of actuator fluid lines 104a, 104b and a pair of aircraft fluid lines 106a, 106b. The hydraulic valve 102 is illustrated as a rotary valve; however, other types of valves can be employed. For example, the hydraulic valve 102 can be packaged into a normally closed, momentarily actuated, linear hydraulic valve.

The actuator fluid lines include an actuator supply line 104a in fluid communication with the actuator supply fluid port 54-1 and an actuator return line 104b in fluid communication with the actuator return fluid port 54-2. The aircraft fluid lines include an aircraft supply line 106a and an aircraft return line 106b. The aircraft supply line 106a and aircraft return line 106b are in fluid communication with a hydraulic system 108 integrated with the aircraft (i.e., installed directly on the aircraft) to deliver and receive hydraulic fluid.

Figure 3A:
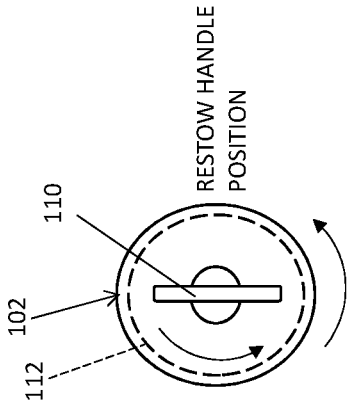
FIGS. 3A and 3B depict a manually actuated restow valve in a normal position according to a non-limiting embodiment.
Figure 4A:
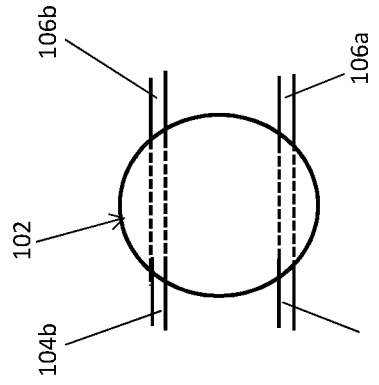
FIGS. 4A and 4B depict the manually actuated restow valve in a restow position according to a non-limiting embodiment.

The manually actuated hydraulic restow valve 102 includes a grip 110 (e.g., a handle) configured to transition the valve from a first position, e.g., a normal operating position (see FIG. 3A) to a second position, e.g., a restow operating position (see FIG. 4A). In one or more embodiments, the valve 102 can employ a restrictive orifice (not shown) that limits the hydraulic fluid flow rate to control the speed to retraction, and a pressure relief valve (not shown) to limit pressure within the actuator assembly 26.

Figure 3B:
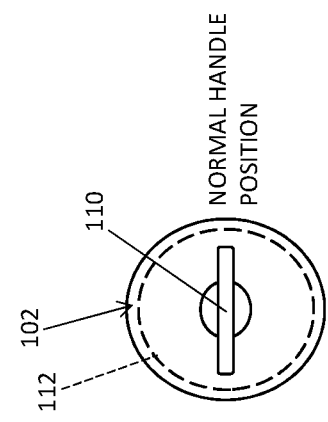
Figure 4B:
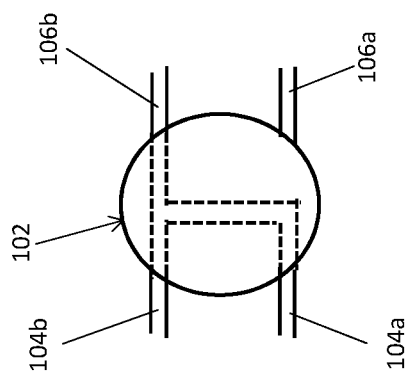
Figure 5:
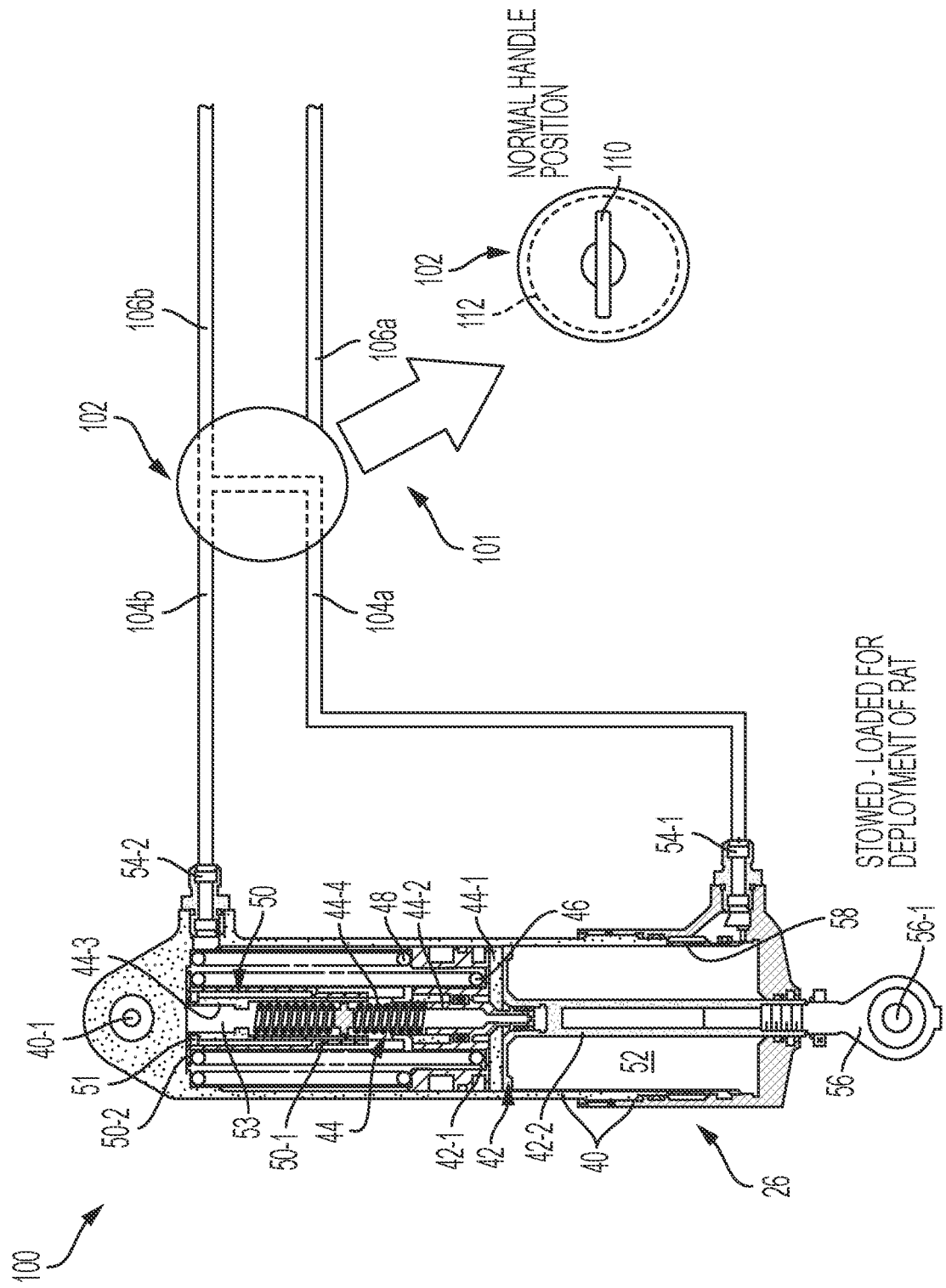
FIG. 5 illustrates operation of the RAT actuator assembly and manually actuated hydraulic restow circuit while the actuator is in the stowed position and the manually actuated restow valve is in the normal operating position according to a non-limiting embodiment.

In the normal operating position, the actuator supply line 104a is placed in fluid communication with the actuator return line 104b while closing the fluid path to the aircraft supply line 106a (see FIG. 3B). Accordingly, fluid can be ejected from the lower fluid compartment 52 of the actuator assembly 26 and recycled back into the upper fluid compartment 53 as discussed in greater detail below. In addition, the need for a localized fluid reservoir is eliminated. When placed in the restow operating position, however, the actuator supply line 104a is placed in fluid communication with the aircraft supply line 106a (see FIG. 4B). In this manner, fluid can be delivered from the aircraft supply line 104a to the actuator supply line 106a and into the lower fluid compartment 52 of the actuator assembly 26.

In one or more non-limiting embodiments, the valve 102 can include a valve spring 112 that is biased according to the normal operating position. When the valve 102 is placed into the restow operating position, the valve spring 112 is loaded so that the valve 102 can be automatically returned to the normal operating position when a human operator (e.g., ground maintenance crew member) releases the grip 110. The automatic retraction of the valve 102 into the normal operating condition ensures that the correct pressure differential is applied to the actuator assembly 26 so that the actuator assembly 26 can properly transition into the deployed position when the uplock is released.

With reference now to FIGS. 5-8, operation of the RAT actuator assembly 26 and manually actuated hydraulic restow circuit 101 will be described according to non-limiting embodiments of the invention. At FIG. 5, the RAT actuator assembly 26 is illustrated in an initial stowed position. In the initial stowed position, the piston 42 is locked in its upper-most position via the locking mechanism. Further, the manually actuated hydraulic valve 102 exists in the normal operating position such that the actuator supply line 104a is placed in fluid communication with the actuator return line 104b while blocking the fluid path to the aircraft supply line 106a.

Referring to FIG. 6, the RAT actuator assembly 26 is illustrated in the deployed position with arrows showing fluid communication during deployment. The deployed position is effected by releasing the locking mechanism and forcing fluid (indicated as dark arrows) into the aircraft return line 106b. The fluid from the lower fluid compartment 52 is recirculated through the valve 102 and into the upper fluid compartment 53 rather than flowing into the aircraft supply line 106a. Accordingly, the valve 102 allows fluid communication between the actuator return line 104b and the aircraft return line 106b, while blocking the high pressure aircraft supply line 106a to force the piston 42 downward into its lower-most position to deploy a RAT (not shown if FIG. 5) coupled to connection point 56-1.

Figure 7:
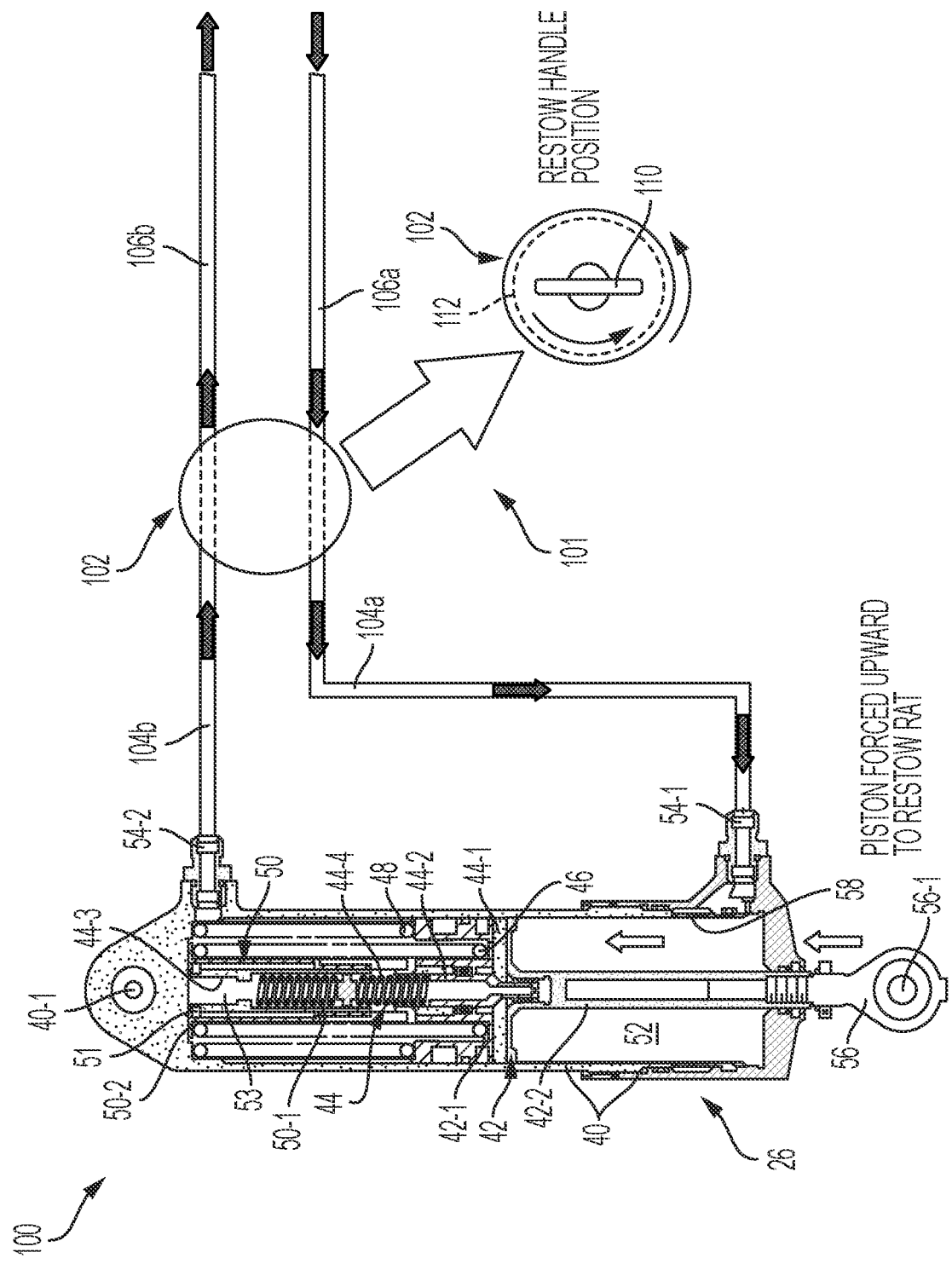
FIG. 7 illustrates operation of the RAT actuator assembly and manually actuated hydraulic restow circuit when placing the manually actuated restow valve in the restow position to retract the actuator into stowed position according to a non-limiting embodiment.

Turning now to FIG. 7, the RAT actuator assembly 26 and manually actuated hydraulic restow circuit 101 is illustrated when placing the manually actuated restow valve 102 in the restow position to restow a RAT. The restow position is invoked by manually transitioning (e.g., rotating) the hydraulic valve 102 from the normal operating position to the restow operating position as further shown in FIG. 7. As mentioned above, the valve 102 can include a valve spring 112 that is biased according to the normal operating position. When the valve 102 is placed into the restow operating position as shown in FIG. 7, the valve spring 112 is loaded so that the valve 102 can be automatically returned to the normal operating position when a human operator (e.g., ground maintenance crew member) releases the grip 110.

In response to effecting the restow position, the actuator supply line 104a is placed in fluid communication with the aircraft supply line 106a. In this manner, fluid can be delivered from the aircraft supply line 106a to the actuator supply line 104a and into the lower fluid compartment 52 of the actuator assembly 26. The fluid input to the lower fluid compartment 52 increases the pressure therein, which in turn forces the piston 42 upward until it is locked via the locking mechanism in its upper-most position. As the piston 42 moves upward, fluid is ejected from the upper fluid compartment 53 via the actuator return line 104b and can be delivered back into the aircraft hydraulic system via the aircraft return line 106b.

Figure 8:
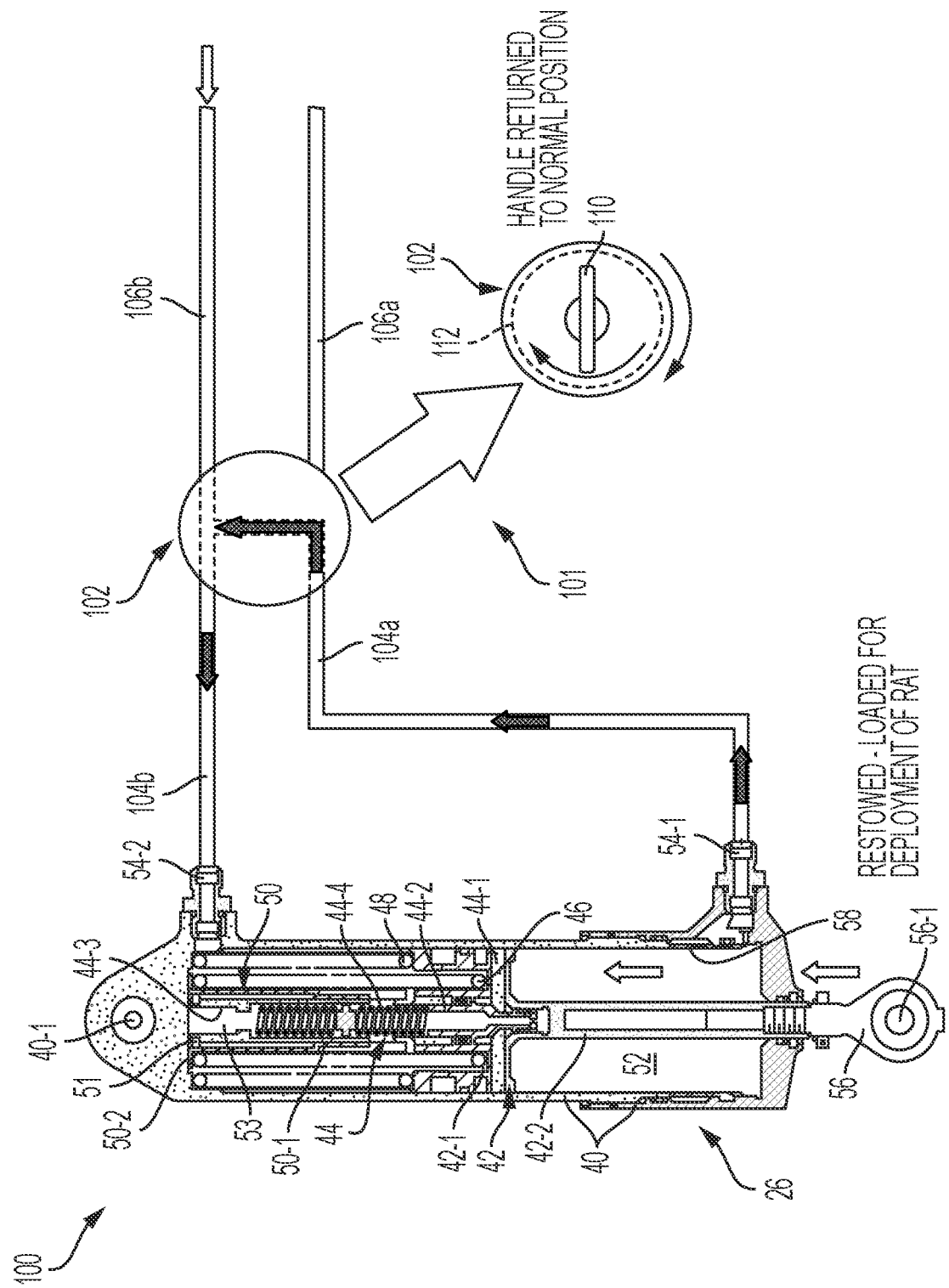
FIG. 8 illustrates operation of the RAT actuator assembly and manually actuated hydraulic restow circuit when returning the manually actuated restow valve in the normal position according to a non-limiting embodiment.

Turning to FIG. 8, the RAT actuator assembly 26 and manually actuated hydraulic restow circuit 101 when returning the manually actuated restow valve 102 in the normal position. Accordingly, the actuator supply line 104a is again placed in fluid communication with the actuator return line 104b while blocking the fluid path to the aircraft supply line 106a. In embodiments where the valve 102 includes the valve spring, the valve 102 is automatically returned to the normal operating position when a human operator (e.g., ground maintenance crew member) releases the grip 110 as shown in FIG. 8. Accordingly, the automatic retraction of the valve 102 into the normal operating condition ensures that the actuator assembly 26 can properly transition back into the deployed position when the locking mechanism is released to deploy the RAT for future use.

As described herein, various non-limiting embodiments provide a hydraulic restow circuit that includes a manually actuated hydraulic restow valve that supplies high pressure fluid to an actuator assembly. The high pressure fluid forces a piston in the actuator to retract, thereby restowing a RAT coupled to the piston into a stow position. The hydraulic restow circuit includes a restow valve installed between the actuator ports of the in fluid communication with the actuator assembly and hydraulic ports in fluid communication with the aircraft. Transitioning the valve from a normal position to a restow position allows high pressure fluid to be ported into a lower fluid compartment of the actuator assembly, thereby transitioning the actuator assembly in the stowed state to restow the RAT.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A ram air turbine (RAT) restow system comprising:
an actuator assembly including a piston interposed between an upper fluid compartment and a lower fluid compartment, the actuator assembly configured to selectively move the piston between a deployed position and a stowed position; and
a hydraulic restow circuit configured to receive fluid, the hydraulic restow circuit including a manually actuated restow valve configured to operate in a first position that establishes a first fluid path to deliver the fluid to the upper fluid compartment to effect the deployed position and a second position that establishes a second fluid path to deliver the fluid to the lower fluid compartment to transition from the deployed position to the stowed position,
wherein the manually actuated restow valve rotates about a center axis in a first direction in response to receiving a rotational force manually applied to the manually actuated restow valve, and rotates about the center axis in a second direction opposite the first direction in response to manually removing the rotational force,
wherein the hydraulic restow circuit further comprises:
an actuator supply line including a first end in fluid communication with the actuator assembly and a second end in fluid communication with a third fluid path of the restow valve;
a aircraft return line including a first end in fluid communication with the third fluid path;
an aircraft supply line in fluid communication with the restow valve; and
an actuator return line including a first end in fluid communication with the actuator assembly and a second end in fluid communication with one of a first valve fluid path of the restow valve when the restow valve is in the first position or a second valve fluid path of the restow valve when the restow valve is in the second position,
wherein the actuator return line is in fluid communication with both the actuator supply line and the aircraft return line via the first valve fluid path when the restow valve operates in the first position, and
wherein the actuator return line is disconnected from the both the actuator supply line and the aircraft supply line, and is in fluid communication with the aircraft return line via the second valve fluid path when the restow valve is in the second position.

2. The RAT restow system of claim 1, wherein the second fluid path delivers the fluid to the lower fluid compartment such that the piston is forced into the upper fluid compartment to invoke the stowed position.

3. The RAT restow system of claim 1, wherein the hydraulic restow circuit is interposed between the actuator assembly and a hydraulic fluid system integrated with an aircraft and is configured to output the fluid.

4. The RAT restow system of claim 2, wherein the manually actuated restow valve includes:
a grip configured to receive the rotational force manually applied thereto; and
a valve spring that is elastically biased according to the first position.

5. The RAT restow system of claim 4, wherein the valve spring is elastically loaded in response to transitioning the manually actuated restow valve from the first position to the second position, and the valve spring automatically returns the manually actuated restow valve to the first operating position in response to manually releasing the grip such that the manually actuated restow valve is forced from the second position.

6. The RAT restow system of claim 1, wherein the aircraft supply line is completely disconnected from the actuator supply line, the actuator return line, and the aircraft return line when the restow valve is in the first position.

* * * * *